March 9, 1943.   C. SAURER   2,313,587
VEHICLE FENDER
Filed Dec. 17, 1940
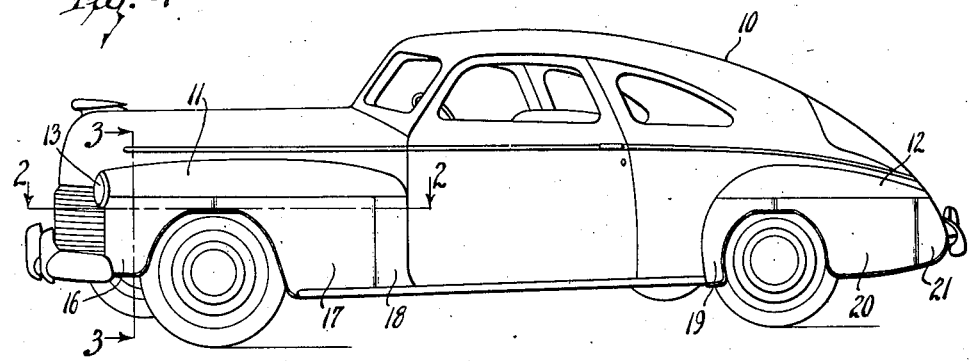
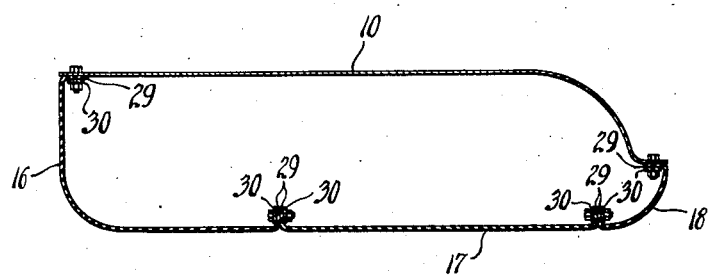
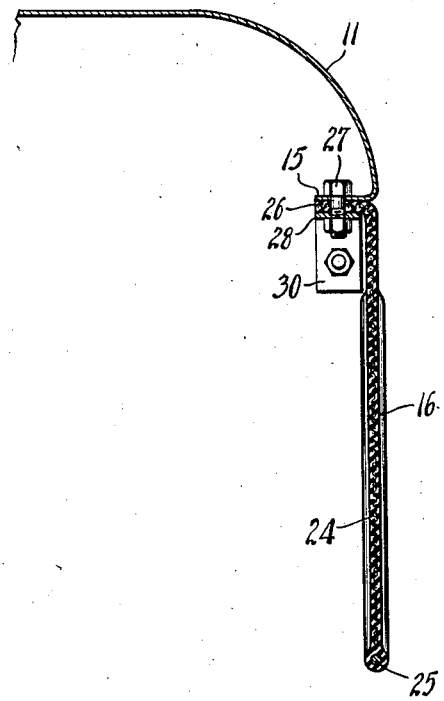
INVENTOR
CURT SAURER
BY
ATTORNEYS Patented Mar. 9, 1943

2,313,587

UNITED STATES PATENT OFFICE 2,313,587

VEHICLE FENDER

Curt Saurer, Akron, Ohio

Application December 17, 1940, Serial No. 370,473

4 Claims. (Cl. 280—152)

This invention relates to vehicle fenders, and more especially it relates to fenders composed principally of non-metallic material, such as rubber, for use upon motor vehicles.

Fenders of motor vehicles usually are one-piece structures made of sheet metal that is stamped to shape. In modern motor cars the fenders are of complex shape, thus requiring expensive, complicated, and relatively huge dies for the manufacture thereof. Vehicle fenders are subject to hard service, especially in the winter season when they are splashed with mud and ice, and frequently with salt that may be used on city streets for melting the snow thereon. Consequently the fenders usually deteriorate before the other parts of vehicle bodies. Furthermore, the fenders of vehicles are especially vulnerable to denting such as occurs from collision with obstructions or other vehicles while the vehicles are being driven or parked.

Rubber fenders for motor vehicles are not broadly new, but have been adapted only to a limited extent due to numerous objections to rubber fenders such as heretofore have been provided. For example, the flexibility of rubber fenders heretofore provided has required them to be extensively reinforced, so as to hold their shape; difficulty has been experienced in supporting the fender on a vehicle; they are not suitable for carrying heavy headlamps such as are mounted in or on the fenders of modern motor cars; and production of the fenders has required large and expensive molding and vulcanizing apparatus.

The chief objects of this invention are to provide improved rubber fenders for motor vehicles, which fenders are readily mountable on the vehicles; that will retain their proper shape throughout the life of the vehicle; and that do not require huge and expensive molds for their manufacture. Other objects will be manifest as the description proceeds.

Of the accompanying drawing:

Figure 1 is a perspective view of a motor vehicle, and the improved fenders mounted thereon;

Figure 2 is a section on a larger scale on the line 2—2 of Fig. 1; and

Figure 3 is a section on a larger scale on the line 3—3 of Fig. 1.

Referring to Fig. 1 of the drawing, there is shown a motor vehicle body 10, and 11, 12 are the crowns of fenders over respective front and rear wheels thereof. Each fender crown is made of metal, preferably in one piece, and is suitably shaped to provide the desired streamline effect, the bottom margin of each being horizontally disposed, that is, parallel to the roadway. At their front ends, the front fender crowns 11 may be so constructed as to constitute supports for headlamps, such as the headlamp 13, that are inset therein.

The rubber fenders are suspended from the fender crowns 11 and 12, and to this end the margins of the latter are formed with inturned flanges that are co-extensive therewith, the marginal flange of fender crown 11 being shown at 15, Fig. 3. The rubber fenders are sectional, that is, they are constructed in panels, each panel being attached along its upper margin to a fender-crown-flange 15, and having its lateral margins attached to adjacent fender panels or to a panel and the adjacent portion of the vehicle body. As shown in Fig. 1, the front fender is composed of panels 16, 17 and 18, and the rear fender is composed of panels 19, 20 and 21, but a greater or fewer number of panels may be employed if desired.

The fender panels are composed principally of resilient rubber composition, but may be interiorly reinforced by heavy duck or by wire screening 24, as shown in Fig. 3. The lower margin of each panel is formed with a bead which preferably includes a heavy wire or rod 25 as a reinforcement to prevent warping of the panel. The upper margin of each panel is provided with a laterally directed flange 26, which flange abuts the fender-crown flange 15 and is secured to the latter by means of a plurality of bolts 27. The bolts 27 also secure a metal strip 28 to the under side of flange 26, which strip assists in preserving a closed juncture of the flanges 15, 26. In like manner the lateral margins of each panel are formed with respective flanges 29 that are directed inwardly toward the body of the vehicle, the flanges 29 of adjacent panels being disposed in face to face relation and fastened together between metal strips 30, 30 that prevent local spreading apart of the flange-junctures, and also serve to impart rigidity to the assembled fender structure. The flanges 29 on one margin of the end panels of each fender structure bear flush against the body of the vehicle and are bolted thereto in the manner previously described with relation to adjacent flanges, including the provision of the metal strips 30, as is best shown in Fig. 2.

From the foregoing it will be apparent that the improved fenders, made in panels or sections, may be much more economically manufactured than the one piece fenders heretofore provided. The fenders readily are made in colors that match the color scheme of the remainder of the vehicle. The fenders possess all the advantages inherent in the use of rubber, and achieve the other advantages set out in the foregoing statement of objects.

Modification may be resorted to without departing from the spirit of the invention or the scope thereof as defined by the appended claims.

What is claimed is:

1. In a motor vehicle fender, the combination of a crown portion consisting of a one-piece structure of rigid material positioned over a wheel of the vehicle, a structure of resilient material depending from the margin of said crown portion, said resilient structure comprising a longitudinal series of marginally abutting panels, and means reinforcing the margins of said panels.

2. In a motor vehicle fender, the combination of a crown portion consisting of rigid material positioned over a wheel of the vehicle, and a sectional structure of resilient material depending from a margin of said crown portion, said sectional structure comprising marginally abutting panels connected to each other, opposite ends of the sectional structure being secured to the vehicle body.

3. A combination as defined in claim 2 wherein the connections between the panel margins and adjacent structure comprise reinforcing strips of metal.

4. In a motor vehicle fender, the combination of a crown portion consisting of rigid material positioned over a wheel of the vehicle and formed with a turned-in flange, a portion comprising a longitudinal succession of marginally abutting panels composed of resilient material and formed with an inturned flange on its upper margin, means connecting said portions to each other through the agency of said flanges whereby the resilient portion is suspended from said crown portion, and means connecting the abutting margins of the panels to each other, said means constituting transverse reinforcement for the resilient portion.

CURT SAURER.